United States Patent [19]
Won et al.

[11] Patent Number: 6,024,327
[45] Date of Patent: Feb. 15, 2000

[54] METHOD AND APPARATUS FOR INTELLIGENT ATTITUDE AND ORBIT CONTROL ONBOARD A SATELLITE

[75] Inventors: Chang Hee Won; Jeong Sook Lee, both of Daejeon, Rep. of Korea

[73] Assignee: Electronics and Telecommunications Research Institute, Daejeon, Rep. of Korea

[21] Appl. No.: 09/078,339

[22] Filed: May 14, 1998

[30] Foreign Application Priority Data

May 15, 1997 [KR] Rep. of Korea ...................... 97-18814

[51] Int. Cl.[7] ............................................... B64G 1/24
[52] U.S. Cl. ........................... 244/164; 244/169; 244/171
[58] Field of Search ................................ 244/171, 158 R, 244/164, 165, 169; 701/13

[56] References Cited

U.S. PATENT DOCUMENTS

| | | |
|---|---|---|
| 4,288,051 | 9/1981 | Goschel . |
| 4,617,634 | 10/1986 | Izumida et al. . |
| 4,767,084 | 8/1988 | Chan et al. . |
| 5,430,654 | 7/1995 | Kyrtsos et al. . |
| 5,430,657 | 7/1995 | Kyrtsos . |
| 5,443,231 | 8/1995 | Anzel . |
| 5,528,502 | 6/1996 | Wertz . |
| 5,534,875 | 7/1996 | Diefes et al. . |

OTHER PUBLICATIONS

Development of GPS–Based Attitude Determination Algorithms; Jyh–Ching Juang and Guo–Shing Huang; Jul. 1997; pp. 968–976.

Topex/Poseidon Autonomous Maneuver Experiment (Tame) Design and Implementation; T. Kia, J. Mellstrom, A. Klumpp, T. Munson and P. Vaze; 1997; pp. 41–56.

Autonomous Navigation; C. Jayles, F. Alby, J.P. Berthias, D. Pradines; 1995; pp. 1552–1580.

*Primary Examiner*—Galen L. Barefoot
*Attorney, Agent, or Firm*—Antonelli, Terry, Stout & Kraus, LLP

[57] ABSTRACT

The present invention provides an improved intelligent control apparatus and method of a satellite where the orbit and attitude control are executed autonomously onboard the satellite. The satellite makes an intelligent decision whether the satellite should be in normal operations mode or in the contingency mode, and if the satellite is in the normal mode, then attitude and orbit of satellite is controlled autonomously to maintain the predetermined attitude and orbit. If the satellite is in the contingency mode, then the satellite decides whether there is collision danger and executes emergency orbit maneuver automatically if such danger exists. Furthermore the satellite checks for the anomaly functioning sensors and actuators, and discontinues their usage.

10 Claims, 5 Drawing Sheets

METHOD AND APPARATUS FOR INTELLIGENT ATTITUDE AND ORBIT CONTROL ONBOARD A SATELLITE

BACKGROUND OF THE INVENTION

1. Field of the Invention

The present invention relates to a system for an intelligent attitude and orbit control of a satellite, and more particularly to improved intelligent control apparatus and method where autonomous attitude and orbit control are performed onboard a satellite in normal and contingency modes.

2. Description of the Conventional Art

Conventionally, attitude determination and control are performed automatically onboard a satellite. There are patents to improved the accuracy of the attitude control system using inertial sensor and the star sensor. See U.S. Pat. No. 4,617,634, entitled, "Artificial Satellite Attitude Control System," dated Oct. 14, 1986. On the other hand, conventional orbit control method requires tracking of the satellite from the ground, calculation of the parameters to change the orbit, and transmitting commands to the satellite. But this method requires much financial and human resources. Also there exists potential for the human error in the process. Thus, Wertz proposed the method of maintaining an assigned orbit without control or intervention from the ground. See U.S. Pat. No. 5,528,502, entitled "Satellite Orbit Maintenance System," dated Jan. 18, 1996. The present invention provides a method and apparatus to control both attitude and orbit of a satellite autonomously based on intelligent decisions onboard the satellite.

For controlling orbit and attitude of a satellite automatically, the position of a satellite has to be determined (Navigation technique), and controlled (Guidance technique).

Navigation and guidance technique is being actively studied and some of them are being registered as patents.

Navigation technique is reported in the paper, "Autonomous Navigation" C. Jayles, F. Alby, J. Berthios, D. Pradines, Spaceflight Dynamics Part II, Edited by Jean-Pierre Carrou, CNES, 1995. And Navigation technique is disclosed as a patent, "Method and Apparatus for predicting the position of a satellite in a satellite based navigation systems (U.S. application Ser. No. 5,430,657).

Also, Guidance technique is reported in "TOPEX/POSEIDON Autonomous Maneuver Experiment (TAME) Design and Implementation" by T. Kia, J. Mellstrom, A. Klumpp, T. Munson, and P Vaze, Advances in the Astronautical Sciences, Guidance and Control 1997, Edited by Robert Culp and Stuart Wiens, American Astronautical Society Publication, pp. 41–56.

There are several reports and registered patents, for attitude control e.g., U.S. Pat. Nos. 5,534,965, 5,458,300 and 5,412,574.

It is desirable to have a system where the attitude the the orbit are maintained autonomously onboard the satellite autonomously onboard the satellite during the normal operational mode. Furthermore, in the contingency situation such as when the collision danger exists or when a sensor or an actuator fails, we require the satellite to maneuver automatically to avoid the collision or to operate without the failed sensor. Thus, an intelligent decision making process for the attitude and orbit control are highly desired quality.

SUMMARY OF THE INVENTION

Accordingly, it is an object of the present invention to provide an improved intelligent control apparatus and method for a satellite where the attitude and orbit of a satellite is controlled autonomously onboard the satellite during the normal and contingency modes. During the normal mode, the attitude and the orbit is maintained at the desired value, but in the case of the contingency situation, the satellite automatically controls the attitude and the orbit of the satellite.

To achieve the above object, there is provided an intelligent control apparatus for a satellite which includes an orbit and attitude determining and predicting means for determining and predicting orbit and attitude of a satellite according to a plurality of orbit sensor data; a control judging means for deciding the orbit and the attitude according to the orbit data and the attitude data determined and predicted by said orbit and attitude determining and predicting means; an anomaly control judging means for judging whether an anomaly control has to be executed according to a plurality of anomaly sensor data; a control parameter computing means for computing orbit and attitude control parameters by using an optimal control method according to the result of judgment of said control judging means, or computing anomaly control parameters by using the optimal control method according to the result of judging of said anomaly control judging means; a control command generating means for generating orbit and attitude control commands according to orbit and attitude parameters computed by said control parameter computing means, or generating anomaly control commands according to anomaly control parameters computed by said control parameter computing means; and a control command processing means for processing orbit and attitude commands or anomaly control commands generated from said control command generating means.

To achieve the above object, there is provided an intelligent control apparatus for a satellite which includes an anomaly control means for judging a type of anomaly mode when status of a satellite is judged as an anomaly mode according to a plurality of anomaly sensor data, and executing an anomaly control according to the judged anomaly mode; an orbit control means for determining and predicting an orbit according to GPS orbit data when status of a satellite is judged as normal mode according to a plurality of anomaly sensor data, computing orbit control parameters according to the determined and predicted GPS orbit sensor data, and generating orbit control commands according to the computed orbit control parameters to execute orbit control; and an attitude control means for determining and predicting an attitude according to sensor data when status of a satellite is judged as normal mode according to a plurality of anomaly sensor data, computing attitude control parameters according to the determined and predicted attitude data, and generating attitude control commands according to the computed attitude control parameters to execute attitude control.

To achieve the above object, there is provided an intelligent control method for a satellite which includes the steps of (a) judging the type of anomaly mode when status of a satellite is judged as anomaly mode according to a plurality of anomaly sensor data, and executing anomaly control according to the judged anomaly mode; (b) determining and predicting an orbit according to GPS orbit data when status of a satellite is judged as normal mode according to a plurality of anomaly sensor data, computing orbit control parameters according to the determined and predicted GPS orbit data, and generating orbit control commands according to the computed orbit control parameters to execute orbit control; and (c) determining and predicting an attitude according to sensor data when the status of the satellite is judged as the normal mode according to a plurality of anomaly sensor data, computing orbit control parameters according to the determined and predicted attitude data, and generating attitude control commands according to the computed attitude control parameters to execute attitude control.

To achieve the above object, there is provided an intelligent control method for a satellite which includes the steps of (a) judging according to a plurality of anomaly sensor data whether the satellite is in the anomaly mode executes and anomaly control of a satellite when the status of a satellite is in anomaly mode by the result of the judgment; (b) determining and predicting the orbit according to a plurality of orbit sensor data, computing the current orbit data when status of a satellite is not in the anomaly mode by the result of the judgment in step of (a), comparing the current orbit data with previously stored target orbit data, and judging whether orbit control should be executed; (c) computing a target attitude according to the position of the thrusters and the target orbit when an orbit control is necessary by the result of judgment in step of (b), measuring the attitude of a satellite according to attitude sensor data, computing current attitude data, judging using the current attitude data, the target attitude data and previously stored normal target attitude data whether the attitude control should be executed; (d) measuring the attitude of a satellite according to the attitude sensor data when the orbit control is not necessary by the result of the judgment in step of (b), computing current attitude data, judging using the current attitude data and previously stored normal target attitude data whether the attitude control executes; (e) generating the attitude control parameters when the attitude control is necessary by the result of the judgment in step of (d), generating the attitude control command according to the attitude control parameters, processing the attitude control command according to the generated attitude control command to generate report data, reporting the report data to ground station, and returning to the step of (a) after being in the standby status during predetermined time; (f) computing orbit control parameters according to an optimal control method when the attitude control is not necessary by the result of the judgment in step of (d), generating orbit control commands according to the orbit control parameters, processing the orbit control commands to generate report data, reporting the report data to ground station, and returning to the step of (a) after being in stand-by status.

BRIEF DESCRIPTION OF THE DRAWINGS

The present invention will become more fully understood from the detailed description given hereinbelow and the accompanying drawings which are given by way of illustration only, and thus is not limitative of the present invention, and wherein.

DETAILED DESCRIPTION OF THE INVENTION

Figure 1:
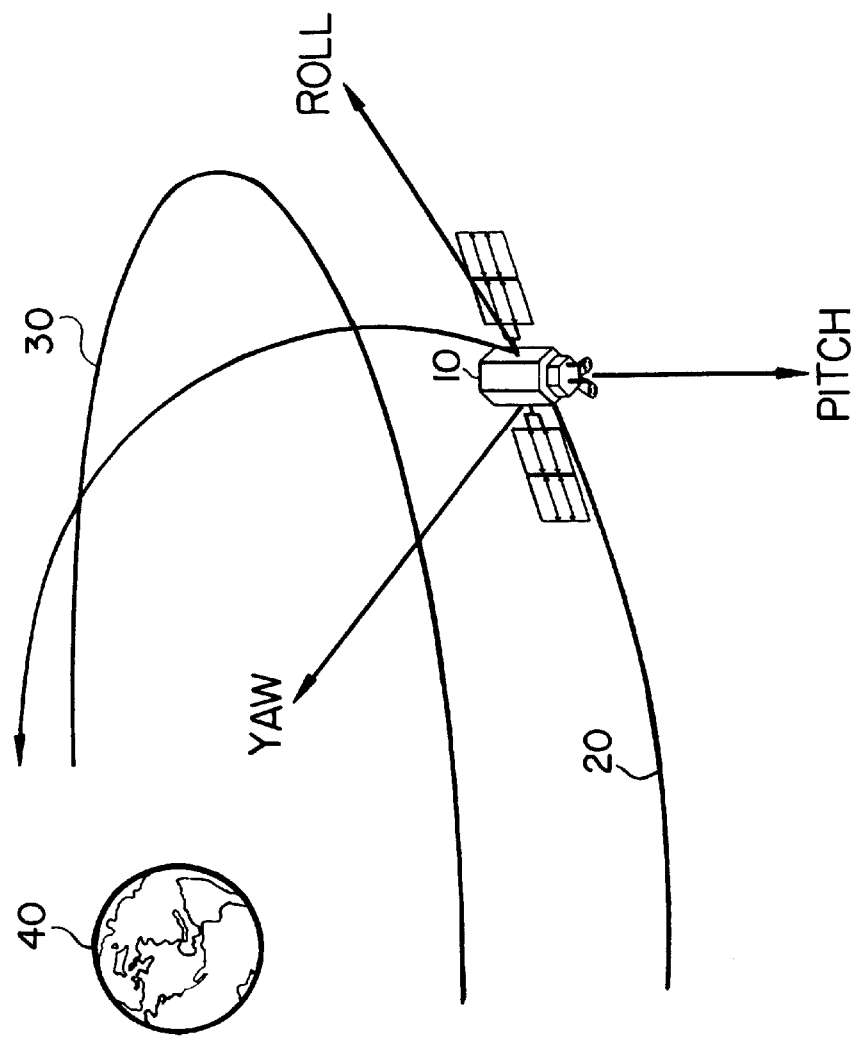
FIG. 1 is a concept diagram for illustrating intelligent control apparatus and method thereof for a satellite according to the present invention.

FIG. 1 is a concept diagram for illustrating an intelligent control apparatus for a satellite according to the present invention.

The orbit of a satellite 10 is controlled, namely the satellite 10 moves from a current orbit 20 to a target orbit 30 by the ground station command or the command generated by the satellite itself.

To control the orbit, the ground station or the satellite must accurately know the attitude and the position of the satellite 10. And there exists several ways of controlling the satellite 10. Among the methods, a method which minimizes the fuel and moving time of the satellite 10 is selected.

Parameters for controlling the orbit are calculated using optimal control method developed in automatic control field.

Figure 2:
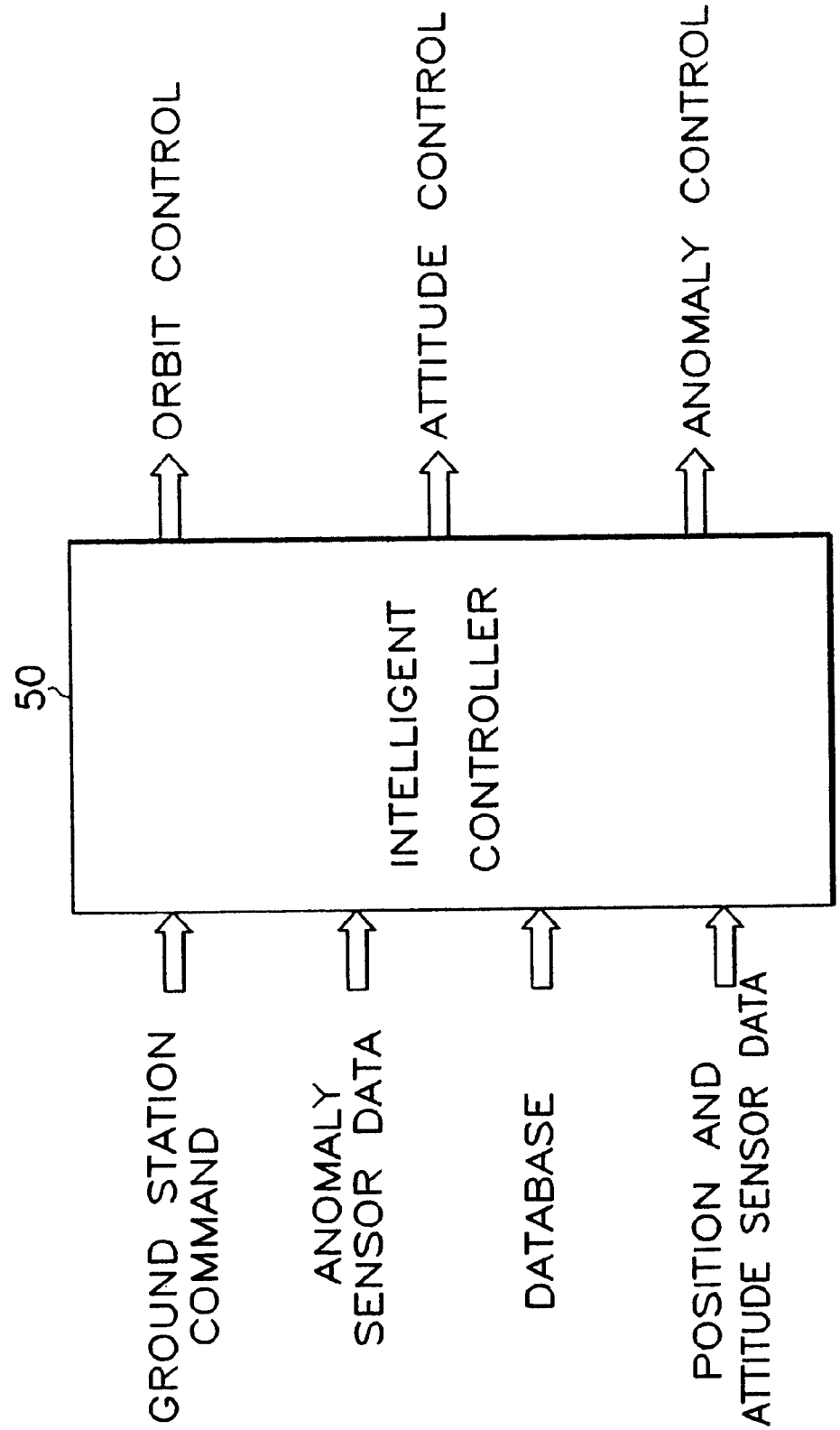
FIG. 2 is a block diagram of intelligent control apparatus for a satellite according to the present invention.

FIG. 2 is a block diagram for illustrating intelligent control apparatus according to the present invention.

As shown therein, the parameters inputted to the an intelligent controller 50 are ground station command, anomaly sensor data, database with reference attitude and orbit, orbit operating plan and the limitations of the intelligent controller, etc., and position and attitude sensor data of the satellite 10.

The ground station commands may be are a discontinuance command, an interrupt command, satellite collision danger information, and hardware failure information, etc.

The intelligent controller 50 decides whether orbit control needs to be executed, whether attitude control executes, or whether anomaly control executes, and executes orbit control, attitude control or anomaly control according to the result of the judgment.

Figure 3:
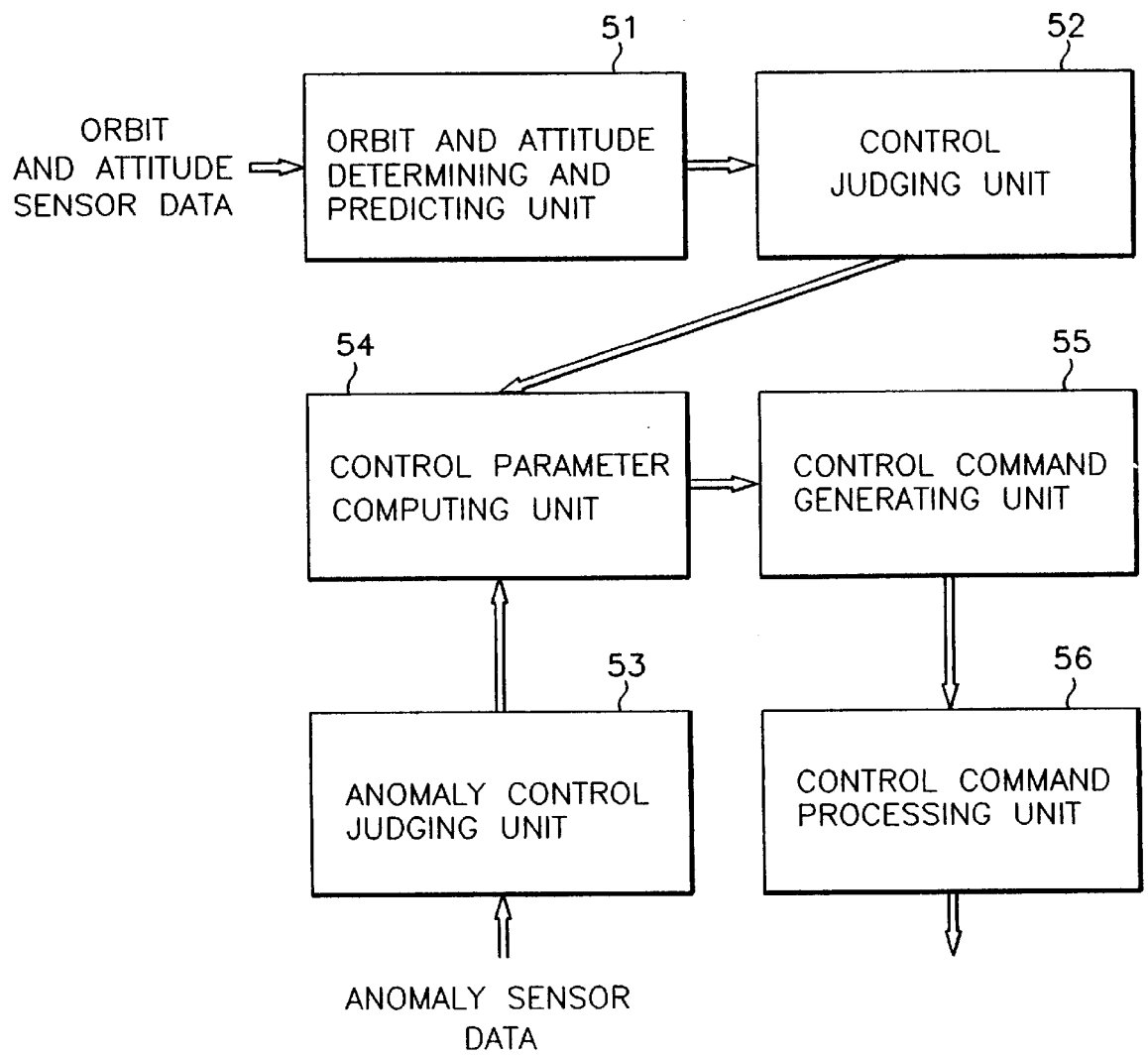
FIG. 3 is a block diagram for illustrating the intelligent controller of FIG. 1 according to the present invention.

FIG. 3 is a block diagram for illustrating the intelligent controller of FIG. 1 according to the present invention.

As shown in FIG. 3, the intelligent control apparatus according to the present invention includes an orbit and attitude determining and predicting unit 51 for determining and predicting the orbit and the attitude of a satellite according to a plurality orbit sensor data, a control judging unit 52 for judging the orbit and the attitude according to the orbit data and attitude data determined and predicted by the orbit and attitude determining and predicting unit 51, an anomaly control judging unit 53 for judging whether anomaly control executes according to a plurality of anomaly sensor data, a control parameter computing unit 54 for computing orbit and attitude parameters by using an optimal control method according to the result of judgment of the control judging unit 52, or computing anomaly control parameters by using the optimal control method according to the result of judging of the anomaly control judging unit 53, a control command generating unit 56 for generating the orbit and the attitude control commands according to orbit and attitude parameters computed by the control parameter computing unit 54, or generating anomaly control commands according to anomaly control parameters computed by the control parameter computing unit 54, and a control command processing unit 56 for processing orbit and attitude commands or anomaly control commands generated from the control command generating unit 55.

Figure 4A:
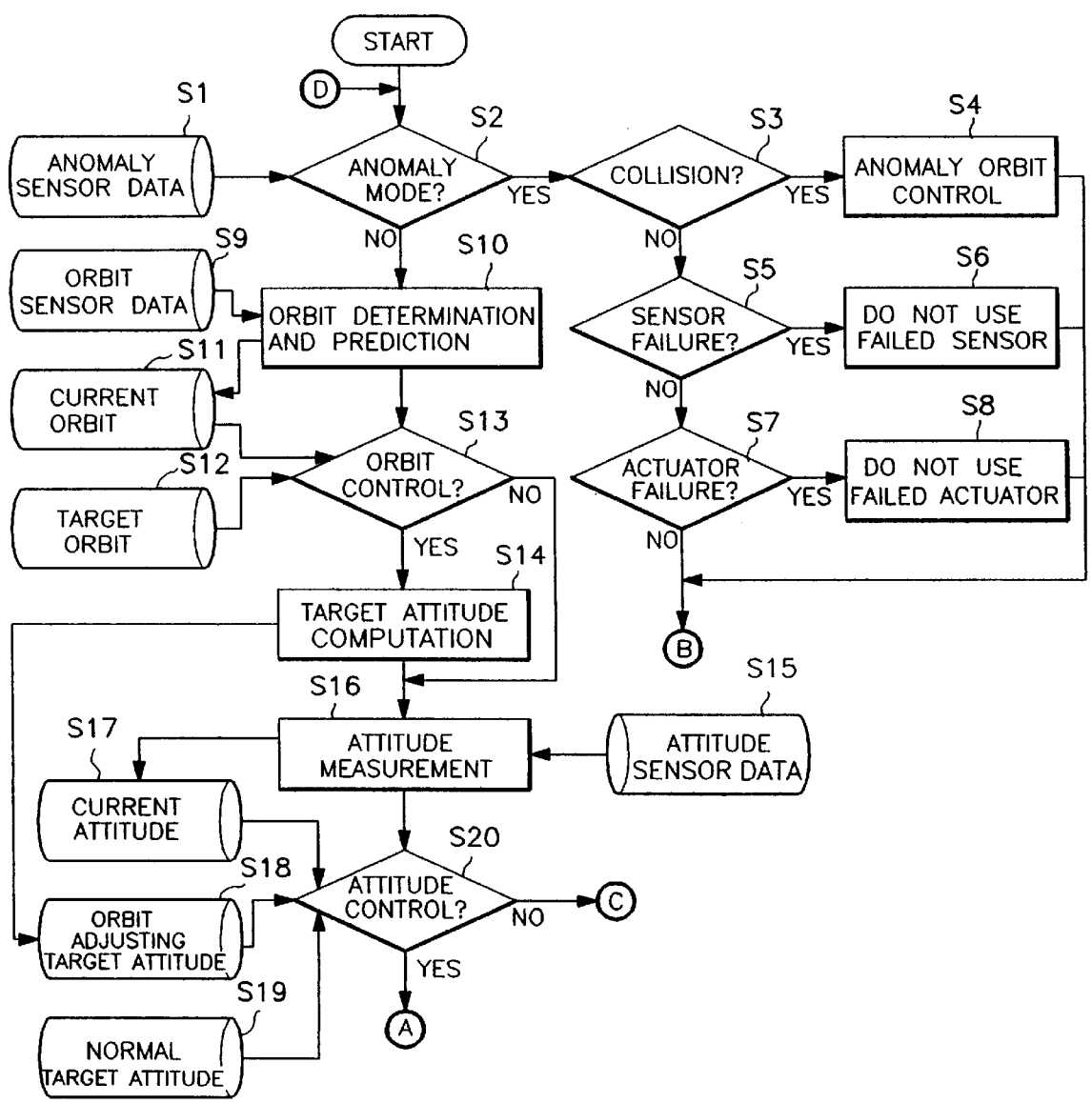
FIGS. 4A and 4B are control flow charts for illustrating intelligent control method for a satellite according to the present invention.
Figure 4B:
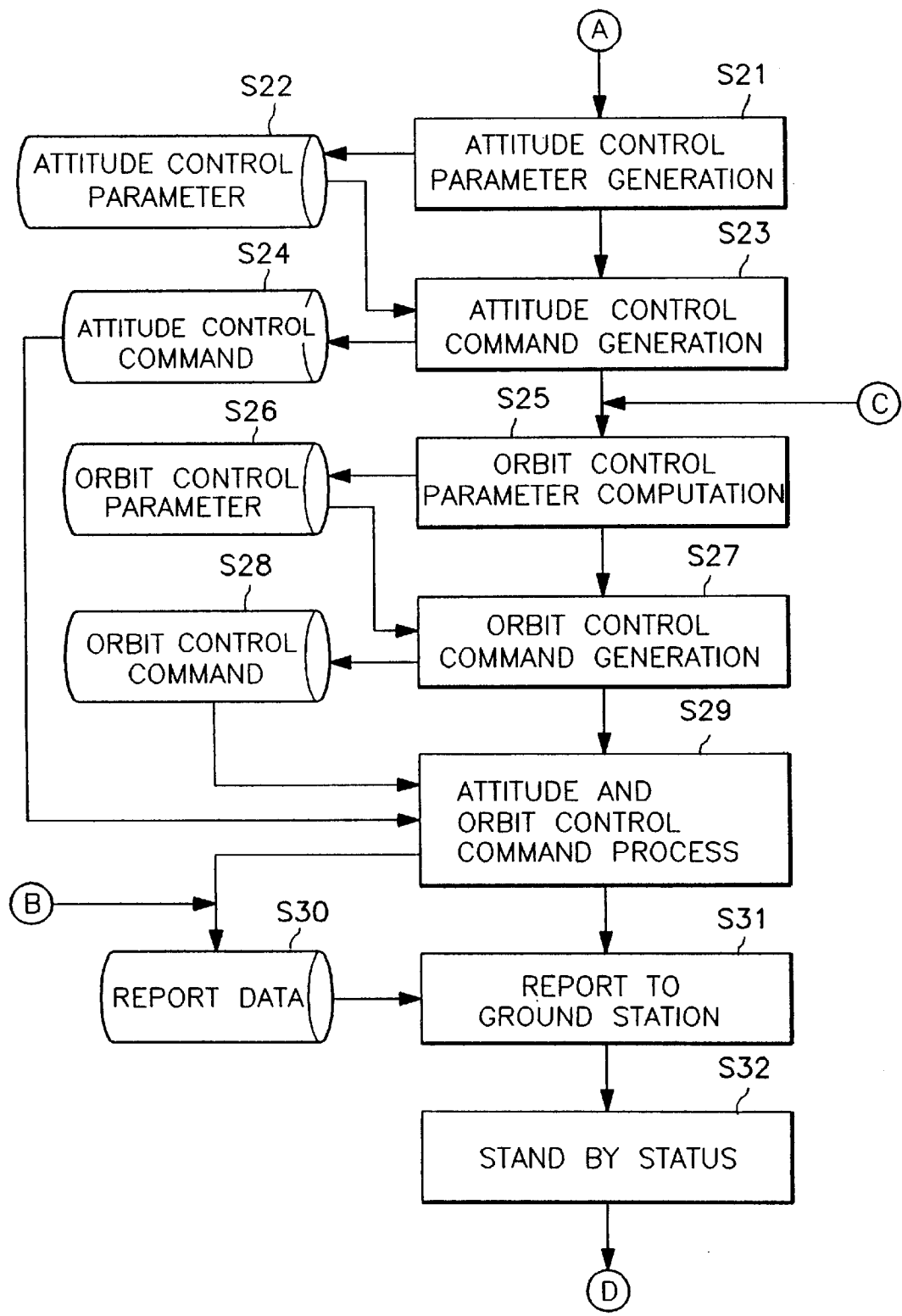

FIGS. 4A and 4B are control flow charts for illustrating intelligent control method for a satellite according to the present invention.

As shown therein, intelligent control method according to the present invention includes the steps of: (a) judging(step S2) whether anomaly mode executes according to a plurality of anomaly sensor data(step S1) and anomaly controlling (steps S3 to S8) of a satellite according to judged anomaly mode when status of a satellite is anomaly mode by the result of judgment; (b) determining and predicting(step S10) an orbit according to a plurality of orbit sensor data(step S9), to compute current orbit data when status of a satellite is not in the anomaly mode by the result of judgment in step of (a), comparing the current orbit data with previously stored target orbit data, and judging(step S13) whether orbit control executes; (c) computing(step S14) a target attitude according to the position of the thrusters and the target orbit when an orbit control is necessary by the result of judgment in step of (b), measuring(step S16) the attitude of a satellite according to an attitude sensor data(step S15), computing a current attitude data, judging(step S20) whether the attitude control executes using the current attitude data, the target attitude data and previously stored normal target attitude data; (d) determining(step S16) the attitude of a satellite according to the attitude sensor data when the orbit control is not necessary by the result of judgment in step of (b), computing current attitude data, judging(step S20) whether the attitude control executes using the current attitude data and previously stored normal target attitude data; (e) generating(step S21) the attitude control parameter when the attitude control is necessary by the result of judgment in step of (d), generating(step S23) the attitude control command according to the attitude control parameters, processing(step S29) the attitude control command according to the generated attitude control command to generate report data, reporting (step S31) the report data to ground station, and returning the step of (a) after being standby status(step S32) during predetermined time; (f) computing(step S25) orbit control parameters according to an optimal control method when the attitude control is not necessary by the result of judgment in step of (d), generating(step S27) orbit control commands according to the orbit control parameters, processing (step S29) the orbit control commands to generate report data, reporting(step S31) the report data to ground station, and returning the step of (a) after being in the stand-by status (step S32).

The intelligent control apparatus and method thereof according to the present invention will now be explained.

First, anomaly sensor data in step S1 include sensors such as motion detector, radar and GPS satellite for sensing collision danger, actuator or sensor failure notification sensor, and information from the ground station. Of course, a ground station can inform the failure of a sensor or an actuator to the satellite.

In step S2, an anomaly control judging unit 53 determines whether the satellite is in the anomaly mode or not using the anomaly sensor data in step S1. In case of the anomaly mode, in step S3, the anomaly control judging unit 53 determines the collision possibility of a satellite through the data sensed by a motion detector, a radar and GPS satellites among many anomaly sensor data.

In case that a satellite is in the collision possibility by the result of judging in step S3, in step S4, a control parameter computing unit 54 computes anomaly control parameters in response to judgment of the anomaly control judging unit 53. A control command generating unit 55 generates anomaly control commands in response to anomaly control parameters computed by the control parameter computing unit 54. In step S4, a control command processing unit 56 processes anomaly control commands generated by the control command generating unit 55 to adjust an orbit anomalously.

In step S30, the control command processing unit 56 generates the anomaly orbit adjusted in step S4 as a report data, stores in database and reports to the ground station.

And then a satellite is in the stand-by status during the predetermined time in step S32. When the stand-by status is completed, the step S2 is repeatedly executed.

In case that the satellite is not in collision possibility by the result of judging in step S3, the anomaly control judging 53 decides whether the failure of a sensor occured based on the ground station information and the anomaly sensor data.

In case that a sensor failure is detected by the result of judgment in step S5, control parameters according to the sensor failure are computed through the control parameter computing unit 54, and the computed control parameter is generated as control commands through the control command generating unit 55. The generated control commands are processed through the control command processing unit 56, and a satellite does not use the failed sensor by processed commands in step S6.

In case that the sensor failure is not detected as the result of the judgment in step S5, the anomaly control judging unit 53 decides whether the failure of actuator has occured from the ground data and the anomaly sensor data.

In case that the actuator failure is detected as the result of the judgment in step S7, the satellite does not use the failed actuator in step S8 when determining and processing the control parameters in the control parameter computing unit 54, the control command generating unit 55 and the control command processing unit 56. And then the steps S30–S32 is repeatedly executed.

In case that the satellite is not in the anomaly mode as the result of judgment in step S2, the orbit and the attitude determining and predicting unit 51 determines and predicts the orbit using orbit data and sensor data stored previously in database in step S9, computes the current orbit and the plan then stores them in the database.

In step S13, a control judgment unit 52 compares the current orbit and the planned orbit with the target orbit and the planed orbit stored previously in the database in step S12 to judge the necessity of orbit control.

In case that the orbit control is necessary as the result of judgment in step S13, the control parameter computing unit 54 computes a target attitude according to the position of the thrusters and the target orbit in step S12 and stores the computed target attitude data in the database.

In step S16, the orbit and attitude determining and predicting unit 51 determines the attitude of the satellite using attitude data stored previously in step S15 to compute the current attitude of the satellite. For determining the current attitude, several sensors, i.e., the earth sensor, sun sensor, gyro and GPS receiver are used.

In step S20, the control judging unit 52 judges the necessity of attitude control using the current attitude data, the target attitude data and a normal target attitude data stored previously in database in step S19.

In case that the attitude is necessary by the result of judgment in step S20, the attitude control parameter computing unit 54 generates attitude control parameters in step S21 and stored the generated attitude control parameters in database.

In step S23, the control command generating unit 55 generates attitude control commands using the generated attitude control parameters and stores the generated attitude control commands in the database.

In steps S25 and S26, the control parameter computing unit 54 computes orbit control parameters according to the judgment in step S13 and stores the computed orbit control parameters in the database.

In steps S27 and S28, the control command generating unit 55 generates orbit commands using the stored orbit control parameters and stores the generated orbit commands.

In step S29, the attitude commands and orbit commands stored in database in steps S24 and S28 are processed by the control command processing unit 56. The processed attitude commands and orbit commands are generated as the report, and then the report is transmitted to the ground station in step S31. The satellite is in the stand-by status and returns to the step S2.

As above-mentioned therein, the present invention has the following effects.

First, the present invention can autonomously control the attitude and the orbit of a satellite onboard. Accordingly, because a satellite can continuously maintain the orbit inputted a prior to the onboard processor, the ground station only has to monitor the status of the satellite and intervene only in a special case.

Second, the present invention can minimize the manpower and equipments necessary on the ground. Accordingly, the duty of the ground station operator is minimized, and thus the cost of operating the ground station is also greatly reduced. Furthermore, the possibility of human error is also reduced by automatically performing the attitude and orbit maneuver onboard the satellite.

Third, the required decision and maneuver time is greatly reduced because the whole process is done onboard the satellite. Accordingly, the present invention is most effective when fast reaction time is compulsory, for example in the case of collision avoidance.

Lastly, the present invention can minimize the fuel usage of the satellite and consequently extend the life of the satellite by using the optimal control techniques.

What is claimed is:

1. An intelligent control apparatus for a satellite, comprising:

an orbit and attitude determining and predicting means for determining and predicting orbit and attitude of a satellite according to a plurality of orbit sensor data;

a control judging means for judging the orbit and the attitude according to the orbit data and the attitude data determined and predicted by said orbit and attitude determining and predicting means;

an anomaly control judging means for judging whether an anomaly control executes according to a plurality of anomaly sensor data;

a control parameter computing means for computing orbit and attitude control parameters by using an optimal control method according to the result of judgment of said control judging means, or computing anomaly control parameters by using the optimal control method according to the result of judging of said anomaly control judging means;

a control command generating means for generating orbit and attitude control commands according to orbit and attitude parameters computed by said control parameter computing means, or generating anomaly control commands according to anomaly control parameters computed by said control parameter computing means; and, a control command processing means for processing orbit and attitude commands or anomaly control commands generated from said control command generating means.

2. The intelligent control apparatus of claim 1, wherein said anomaly control judging means includes first means for judging a collision possibility of a satellite according to the anomaly sensor data and automatically executing anomaly orbit adjustment when a collision danger exists;

second means for judging failure of sensor or actuator according to the anomaly sensor data and not using the failed sensor or actuator.

3. The intelligent control apparatus of claim 1, wherein said anomaly control judging means includes first means for judging a collision possibility of a satellite according to the anomaly sensor data and automatically executing anomaly orbit adjustment when a collision danger exists;

second means for judging failure of a sensor or an actuator according to the anomaly sensor data, searching for a method which can operate the satellite without the failed sensor or actuator when failure of the sensor or the actuator occurs, and executing the satellite using the searched method.

4. An intelligent control apparatus for a satellite, comprising:

an anomaly control means for judging a kind of anomaly mode when status of a satellite is judged as an anomaly mode according to a plurality of anomaly sensor data, and executing anomaly control according to the judged anomaly mode;

an orbit control means for determining and predicting an orbit according to GPS orbit data when status of a satellite is judged as normal mode according to a plurality of anomaly sensor data, computing orbit control parameters according to the determined and predicted GPS orbit sensor data, and generating orbit control commands according to the computed orbit control parameters to execute orbit control; and an attitude control means for determining and predicting the attitude according to the sensor data when the status of a satellite is determined as the normal mode according to a plurality of anomaly sensor data, computing attitude control parameters according to the determined and predicted attitude data, and generating attitude control commands according to the computed attitude control parameters to execute an attitude control.

5. The intelligent control apparatus of claim 4, wherein said anomaly control means includes first means for judging a collision possibility of a satellite according to the anomaly sensor data and automatically executing anomaly orbit adjustment when a collision danger exists;

second means for judging failure of a sensor or an actuator according to the anomaly sensor data and not using the failed sensor or actuator.

6. The intelligent control apparatus of claim 4, wherein said anomaly control means includes first means for judging a collision possibility of a satellite according to the anomaly sensor data and automatically executing anomaly orbit adjustment when a collision danger occurs;

second means for judging failure of sensor or actuator according to the anomaly sensor data, searching a method which can operate a satellite without the failed sensor or actuator when failure of the sensor or the actuator occurs, and executing the satellite using the searched method.

7. An intelligent control method for a satellite, comprising the steps of:

(a) deciding on a kind of anomaly mode when status of a satellite is judged as anomaly mode according to a plurality of anomaly sensor data, and executing anomaly control according to the judged anomaly mode;

(b) determining and predicting orbit according to GPS orbit data when status of a satellite is judged as the normal mode according to a plurality of anomaly sensor data, computing orbit control parameters according to the determined and predicted GPS orbit data, and generating orbit control commands according to the computed orbit control parameters to execute orbit control; and (c) determining and predicting an attitude according to sensor data when status of a satellite is judged as normal mode according to a plurality of anomaly sensor data, computing orbit control parameters according to the determined and predicted attitude data, and generating attitude control commands according to the computed attitude control parameters to execute attitude control.

8. The intelligent control method for a satellite of claim 7, wherein said the step of (a), comprising the sub-steps of:

judging a collision possibility of a satellite according to the anomaly sensor data and automatically executing anomaly orbit adjustment when collision danger exists;

judging failure of sensor or actuator according to the anomaly sensor data and not using the failed sensor or the actuator.

9. The intelligent control method for a satellite of claim 7, wherein said the step of (a), comprising the sub-steps of:

judging a collision possibility of a satellite according to the anomaly sensor data and automatically executing anomaly orbit adjustment when collision danger exists;

judging failure of sensor or actuator according to the anomaly sensor data, searching for a method which can operate the satellite without the failed sensor or actuator when failure of the sensor or the actuator occurs, and executing the satellite using the searched method.

10. An intelligent control method for a satellite, comprising the steps of:

(a) judging according to a plurality of anomaly sensor data whether anomaly mode executes and anomaly controlling a satellite according to judged anomaly mode when status of a satellite is anomaly mode by the result of judgment;

(b) determining and predicting the orbit according to a plurality of orbit sensor data, computing current orbit data when status of a satellite is not in the anomaly mode by the result of judgment in step of (a), comparing the current orbit data with previously stored target orbit data, and judging whether orbit control should be executed;

(c) computing a target attitude according to the positions of the thrusters and the target orbit when an orbit control is necessary by the result of judgment in step of (b), determining the attitude of a satellite according to attitude sensor data, computing current attitude data, judging whether the attitude control should be executed using the current attitude data, the target attitude data and previously stored normal target attitude data;

(d) determining the attitude of a satellite according to the attitude sensor data when the orbit control is not necessary by the result of judgment in step of (b), computing current attitude data, judging whether the attitude control should be executed using the current attitude data and previously stored normal target attitude data;

(e) generating an attitude control parameter when the attitude control is necessary by the result of judgment in step of (d), generating the attitude control command according to the attitude control parameters, processing the attitude control command according to the generated attitude control command to generate report data, reporting the report data to ground station, and returning the step of (a) after being standby status during predetermined time;

(f) computing orbit control parameters according to an optimal control method when the attitude control is not necessary by the result of judgment in step of (d), generating orbit control commands according to the orbit control parameters, processing the orbit control commands to generate report data, reporting the report data to ground station, and returning the step of (a) after being stand-by status.

* * * * *

UNITED STATES PATENT AND TRADEMARK OFFICE
CERTIFICATE OF CORRECTION

PATENT NO. : 6,024,327
DATED : February 15, 2000
INVENTOR(S) : Chang Hee Won, et. al.

It is certified that error appears in the above-identified patent and that said Letters Patent is hereby corrected as shown below:

Title page, item [54] and col. 1, change the title to read--

--METHOD AND APPARATUS FOR INTELLIGENT ATTITUDE AND ORBIT CONTROL SYSTEM ONBOARD A SATELLITE--.

Signed and Sealed this

Sixth Day of February, 2001

Attest:

Q. TODD DICKINSON

*Attesting Officer*     *Director of Patents and Trademarks*